United States Patent
Heymans et al.

(10) Patent No.: US 11,421,069 B2
(45) Date of Patent: Aug. 23, 2022

(54) POLYESTER-POLYOL COMPOSITIONS FOR POLYURETHANE FOAM WITH IMPROVED HYDROLYTIC STABILITY

(71) Applicant: Hexion Inc., Columbus, OH (US)

(72) Inventors: Denis Heymans, Ottignies Louvain-la-Neuve (BE); Françoise Decoq, Ottignies Louvain-la-Neuve (BE)

(73) Assignee: Hexion Inc., Columbus, OH (US)

( * ) Notice: Subject to any disclaimer, the term of this patent is extended or adjusted under 35 U.S.C. 154(b) by 66 days.

(21) Appl. No.: 16/962,316

(22) PCT Filed: Jan. 18, 2019

(86) PCT No.: PCT/EP2019/000017
§ 371 (c)(1),
(2) Date: Jul. 15, 2020

(87) PCT Pub. No.: WO2019/141507
PCT Pub. Date: Jul. 25, 2019

(65) Prior Publication Data
US 2020/0339734 A1     Oct. 29, 2020

(30) Foreign Application Priority Data

Jan. 19, 2018 (EP) .................................... 18075001
Nov. 27, 2018 (EP) .................................... 18075015

(51) Int. Cl.
*C08G 18/76* (2006.01)
*C08G 18/32* (2006.01)
*C08G 18/42* (2006.01)
*C08K 5/1515* (2006.01)

(52) U.S. Cl.
CPC ..... *C08G 18/7671* (2013.01); *C08G 18/3271* (2013.01); *C08G 18/4211* (2013.01); *C08G 18/7621* (2013.01); *C08K 5/1515* (2013.01); *C08G 2110/0008* (2021.01)

(58) Field of Classification Search
CPC ............ C08G 18/3271; C08G 18/4211; C08G 18/6603; C08G 18/7621; C08G 18/7671; C08G 2110/0008; C08K 5/1515; C08L 75/06

See application file for complete search history.

(56) References Cited

U.S. PATENT DOCUMENTS

| | | | | |
|---|---|---|---|---|
| 4,127,542 | A | * | 11/1978 | Kaizerman .......... C08K 5/1515 528/60 |
| 2010/0116829 | A1 | * | 5/2010 | Van Der Wal ..... C08G 18/4018 220/565 |
| 2012/0207925 | A1 | * | 8/2012 | Hornung ................ C08G 18/58 427/230 |
| 2017/0029561 | A1 | * | 2/2017 | Tabor ..................... C08G 18/28 |

* cited by examiner

*Primary Examiner* — John M Cooney

(57) ABSTRACT

The invention relates to compositions of glycidyl ester used as a stabilizer in polyurethane foams formulations having a good resistance to hydrolysis, improved damping with equivalent or improved physical properties, and high sound absorption capacity. The mono or poly-carboxylic acids glycidyl ester is used in amount of 0.1 to 10 weight % over the polyester polyol resin.

20 Claims, No Drawings

POLYESTER-POLYOL COMPOSITIONS FOR POLYURETHANE FOAM WITH IMPROVED HYDROLYTIC STABILITY

FIELD OF INVENTION

The present invention relates to a composition of glycidyl ester used as stabilizer in flexible polyurethane foams formulations having a good resistance to hydrolysis, improved damping with equivalent or improved physical properties. The polyurethane foams are prepared by reacting organic polyisocyanates with mixtures of (a) liquid polyester polyols produced by the polycondensation of organic dicarboxylic acids or derivatives and a polyol mixture, and (b) a glycidyl ester of a mono or poly-carboxylic acids in amount of 0.1 to 10 weight % over the polyester polyol resin, in the presence of catalysts and blowing agents as well as optionally chain extenders, auxiliaries, and additives.

Selected polyester-polyol and the above glycidyl esters mixtures which are employed in the process of this invention exhibit improved compatibility of the components and storage stability.

DESCRIPTION OF THE PRIOR ART

The preparation of polyurethane flexible foams is essentially known and is described in detail in the appropriate literature. The plastics handbook Volume VII "Polyurethanes" by R. Vieweg, A. Hoechtlen, Carl Hanser Publishers, Munich, 1966 is such an example.

In addition to catalysts, blowing agents, auxiliaries, and additives, toluene diisocyanates are used for the preparation of polyurethane flexible foams. In consideration of toxicity and reactivity, mixtures of toluene diisocyanates and crude diphenylmethane diisocyanates may be employed.

Preferably used as the polyhydroxyl compounds are polyether polyols particularly those based on ethylene and/or propylene oxide. One drawback of the polyurethane flexible foams produced from these polyols, is that the general physical properties do not meet the requirements in all areas of application.

If specific requirements are made of the physical property level of polyurethane flexible foams for definite areas of application, polyester polyols may be used for their preparation together or alternative to the polyether polyols. However, the resultant foams have a low resistance to hydrolysis.

In order to reduce these drawbacks, EP0004617 suggests the selection of certain starting components for the preparation of polyurethane flexible foams and the use of a urethane group containing mixture of diphenylmethane diisocyanates and polymethylene polyphenylene-polyisocyanates containing 55 to 85% by weight of diphenyl diisocyanates isomers as the polyisocyanates, polyester polyols or mixtures of polyester polyols and polyether polyols with a polyester polyether content of at least 60% by weight as polyhydroxyl compounds and water and mixtures of water or low boiling, optionally halogen containing hydrocarbons as the blowing agents.

In this manner polyurethane flexible foams can be obtained which have a high load bearing and energy absorption capacity as well as considerable resistance to hydrolysis.

However, even if this process is employed certain difficulties can occur in processing the polyester-polyether polyol mixtures, since the polyester polyols and polyether polyols described require correct mixing in order to avoid phase separation. The U.S. Pat. Nos. 4,374,935 and 5,552, 449 are claiming blend of polyol-ester and polyol-ethers that are solving this aspect of phase separation.

The usage of polyurethane foams has greatly increased in the last years due to innovations and improvements leading to enhanced physical properties. These enhanced physical properties include flame retardation characteristics and the production of foams which do not drip when subjected to high heat.

More recently the U.S. Pat. No. 8,637,584 suggest that the use of fatty amines as catalyst of the reaction polyester-polyol and an isocyanate provide an polyurethane foam with improved resistance to hydrolysis, the economics of these fatty amines could be a limiting factor.

Another drawback of commercially available polyester polyols is the low resistance to hydrolysis which is not improved by being incorporated in the polyurethane foam structure.

The purpose of this invention is to produced polyurethane foams with good resistance to hydrolysis and improved mechanical properties and particularly with a high compression strength and favourable damping behaviour.

The present invention provides foams having all of these desirable characteristics.

After an investigation of the issue that was reported above we found that the use of a glycidyl ester a mono or poly-carboxylic acids in amount of 0.1 to 10 weight % over the polyester polyol resin provides an improved hydrolysis resistance.

DISCLOSURE OF THE INVENTION

Accordingly, the invention provides polyurethane foams with good resistance to hydrolysis and improved mechanical properties and particularly with a high compression strength and favourable damping behaviour.

More in particular the invention relates to the compositions a polyester polyol known in the art can be used, including those produced when a dicarboxylic acid or anhydride is reacted with an excess of a diol. Non-limiting examples include adipic acid or phthalic acid or phthalic anhydride reacting with ethylene glycol or butanediol. However, most common polyester polyols are made from phthalic, isophthalic and terephthalic acids and derivatives. Esterification of these acids with polyol initiators such as ethylene glycol, diethylene glycol, propylene glycol, dipropylene glycol, butanediol, polyethylene glycols of various molecular weights, glycerin, pentanetriol, and the like can yields polyester polyols with different physical properties, molecular weights and molecular architectures but all characterized by their poor hydrolytic stability. Also, polyester polyols useful in the present invention can be produced by reacting a lactone with an excess of a diol, for example, caprolactone reacted with propylene glycol.

The above polyester-polyol resins are combined with a glycidyl ester of a mono or poly-carboxylic acids in amount of 0.1 to 10 weight % over the polyester polyol resin. The glycidyl ester is a mono carboxylic acids glycidyl ester of aliphatic tertiary saturated acid or α,α-branched alkane acid, which contain mostly 9 to 15 carbon atoms, such as Cardura 9 or Cardura 10 (available from Hexion).

In another embodiment the glycidyl ester is a poly carboxylic acids glycidyl ester of aliphatic poly acid with 18 to 36 carbon atoms or cycloaliphatic poly acid with 5 to 15 carbon atoms, such as for example Epikote 760 or Heloxy 71 (available from Hexion).

The blend of the glycidyl ester and the polyester-polyol resin can be done at the end of the manufacturing of the polyol resin at a temperature above 120° C. to reduce the acid value below 2 mg KOH/g, preferably below 1 mg KOH/g, or by blending during the preparation of the part A at temperature below 120° C., of the polyurethane foam compositions.

The part A of the formulation comprise the polyol resin and the glycidyl ester, a blowing agent, such as water, a catalyst for the polyol-isocyanate condensation such as tin derivatives, amines and additives.

The range of glycidyl esters as described above is from 0.1 to 10 weight % of the polyester-polyol resin. The preferred range is form 0.2 to 8 weight %, the most preferred range is from 0.3 to 5 weight % and even further preferred range is from 0.5 to 1 weight % all over the polyester polyol resin.

EXAMPLES

Raw Material
Stepanol PS 3152: Diethylene Glycol-phtalic anhydride based polyester polyol ex Stepan;
Cardura 10 ex Hexion
Epikote 758: ex Hexion
DMEA: N,N-dimethylethanolamine (ex Sigma)

Example 1

Reaction Condition
Ratio acid/Acid Scavenger 1:1.5
Reaction Temperature: 160° C.
Reaction Time: 3 hours
Procedure
Mixture of polyester polyol with the Acid scavenger.
Heat the mixture at the reaction temperature
Follow the acid content
Results

|  | Raw material Starting material | Addition of Cardura10 10 GP | Addition of Epikote 758 |
|---|---|---|---|
| Acid value, mgKOH/g | 2.8 | 0.22 | 0.82 |

Example 2

Storage Stability of the Part a (Polyol+Water+DMEA)
The compositions of glycidyl ester used as stabilizer in polyurethane foams formulations having a good resistance to hydrolysis is demonstrated below,
Preparation and Storage Conditions
Part A is prepared by mixing Polyester polyol with Water=2.78%
DMEAt=3.06%
Reaction Temperature: 80 and 100° C.
Reaction Time: 1 day
Procedure
Part A is mixed with the acid scavenger: Cardura 10 and Epikote 758
The acid scavenger ratios are 0%, 0.5%, 1%, 2% and 5%. The mixture is placed in the oven at the temperature described here above 1 day at 80° C. and 100° C.
The acid value is measured after 1 day. (initial acid value 2.8 mg KOH/gr)

Results
Storage stability at 80° C. —1 Day, as acid value increase.

|  | Ac. Scavenger level, % | | | | |
|---|---|---|---|---|---|
|  | 0 | 0.5 | 1 | 2 | 5 |
| Cardura 10 | 5.63 | 4.45 | 3.61 | 3.25 | 2.61 |
| Epikote 758 | 5.56 | 3.89 | 3.68 | 3.46 | 3.36 |

Storage stability at 100° C. —1 Da, as acid value increase.

|  | Ac. Scavenger level, % | | | | |
|---|---|---|---|---|---|
|  | 0 | 0.5 | 1 | 2 | 5 |
| Cardura 10 | 15.29 | 12.24 | 10.99 | 10.22 | 8.17 |
| Epikote 758 | 15.29 | 12.28 | 11.53 | 9.97 | 6.68 |

We claim:
1. A composition of polyurethane foams, comprising:
an organic polyisocyanate; and
a blend comprising:
(a) a polyester polyol resin produced by a polycondensation reaction of an organic dicarboxylic acid or a derivative, and a polyol mixture; and
(b) a poly-carboxylic acid glycidyl ester in amount of 0.1 to 10 weight % over the polyester polyol resin.
2. The composition of claim 1, wherein the poly-carboxylic acid glycidyl ester (b) is a poly-carboxylic glycidyl ester of an aliphatic poly acid with 18 to 36 carbon atoms or a cycloaliphatic poly acid with 5 to 15 carbon atoms.
3. The composition of claim 1, wherein the poly-carboxylic acid glycidyl ester (b) is blended with the polyester polyol resin (a) at an end of the polycondensation reaction at a temperature above 120° C.
4. The composition of claim 1, wherein the poly-carboxylic acid glycidyl ester (b) is blended with the polyester polyol resin (a) at a temperature below 120° C.
5. The composition of claim 1, wherein the poly-carboxylic acid glycidyl ester (b) is present in a level of 0.2 to 8 weight % over the polyester polyol resin.
6. The composition of claim 1, wherein the poly-carboxylic acid glycidyl ester (b) is present in a level of 0.3 to 5 weight % over the polyester polyol resin.
7. The composition of claim 1, wherein the poly-carboxylic acid glycidyl ester (b) is present in a level of 0.5 to 1 weight % over the polyester polyol resin.
8. The composition of claims 1, further comprising:
a catalyst for condensing the polyester polyol resin and the organic polyisocyanate: and
a blowing agent.
9. The composition of claim 1, further comprising a chain extender, an additive, or both.
10. The composition of claim 1, wherein the blend has an acid value below 2 mg KOH/g.
11. The composition of claim 1, wherein the derivative is an anhydride.
12. A polyurethane foam composition, comprising:
an organic polyisocyanate; and
a mixture comprising:
a polyester polyol resin produced by a polycondensation reaction of:
an organic dicarboxylic acid or an anhydride; and
a polyol mixture; and
a poly-carboxylic acid glycidyl ester in an amount of 0.1 to 10 weight % over the polyester polyol resin.

13. The polyurethane foam composition of claim 12, wherein the poly-carboxylic acid glycidyl ester is a poly-carboxylic acid glycidyl ester of an aliphatic poly acid with 18 to 36 carbon atoms.

14. The polyurethane foam composition of claim 12, wherein the poly-carboxylic acid glycidyl ester is a poly-carboxylic acid glycidyl ester of a cycloaliphatic poly acid with 5 to 15 carbon atoms.

15. The polyurethane foam composition of claim 12, wherein the poly-carboxylic acid glycidyl ester is mixed with the polyester polyol resin at an end of the polycondensation reaction at a temperature above 120° C.

16. A polyurethane foam composition, comprising:
   an organic polyisocyanate; and
   a mixture comprising:
      a polyester polyol resin produced by reacting:
         an anhydride; and
         a polyol mixture; and
      a poly-carboxylic acid glycidyl ester in an amount of 0.1 to 10 weight % over the polyester polyol resin.

17. The polyurethane foam composition of claim 16, wherein the anhydride is a phthalic anhydride.

18. The polyurethane foam composition of claim 16, wherein the mixture has an acid value below 1 mg KOH/g.

19. The polyurethane foam composition of claim 16, wherein the poly-carboxylic acid glycidyl ester is a poly-carboxylic acid glycidyl ester of an aliphatic poly acid with 18 to 36 carbon atoms.

20. The polyurethane foam composition of claim 16, wherein the poly-carboxylic acid glycidyl ester is a poly-carboxylic acid glycidyl ester of a cycloaliphatic poly acid with 5 to 15 carbon atoms.

\* \* \* \* \*